(12) United States Patent
Ishida

(10) Patent No.: US 7,835,479 B2
(45) Date of Patent: Nov. 16, 2010

(54) JITTER INJECTION APPARATUS, JITTER INJECTION METHOD, TESTING APPARATUS, AND COMMUNICATION CHIP

(75) Inventor: Masahiro Ishida, Tokyo (JP)

(73) Assignee: Advantest Corporation, Tokyo (JP)

( * ) Notice: Subject to any disclaimer, the term of this patent is extended or adjusted under 35 U.S.C. 154(b) by 954 days.

(21) Appl. No.: 11/581,778

(22) Filed: Oct. 16, 2006

(65) Prior Publication Data

US 2008/0089457 A1  Apr. 17, 2008

(51) Int. Cl.
   *H04L 25/00* (2006.01)
(52) U.S. Cl. .................. 375/371; 375/226; 375/357; 375/225; 375/227; 375/280; 327/291; 327/263; 327/299
(58) Field of Classification Search ............. 375/226, 375/371, 357, 227, 225, 280; 324/76; 327/291, 327/156, 263, 299
   See application file for complete search history.

(56) References Cited

U.S. PATENT DOCUMENTS 4,812,919 A * 3/1989 Iwase et al. .................. 386/44
4,916,411 A * 4/1990 Lymer .......................... 331/25
5,852,784 A * 12/1998 Ito et al. .................... 455/552.1
6,842,061 B2 * 1/2005 Suda et al. .................. 327/291
7,315,574 B2 * 1/2008 Hafed et al. ................. 375/226
2005/0066142 A1 * 3/2005 Bhattacharya et al. ...... 711/169
2006/0268970 A1 * 11/2006 Ichiyama et al. ............ 375/226
2008/0025383 A1 * 1/2008 Li .............................. 375/226

FOREIGN PATENT DOCUMENTS

| JP | 2000-221254 A | 8/2000 |
| JP | 2001-013233 A | 1/2001 |
| JP | 2006-041640 A | 2/2006 |

OTHER PUBLICATIONS

International Search Report issued in International Application No. PCT/JP2007/069872 mailed on Dec. 18, 2007, 9 pages.

* cited by examiner

*Primary Examiner*—Eva Y Puente
(74) *Attorney, Agent, or Firm*—Osha•Liang LLP (57) ABSTRACT

There is provided a jitter injection apparatus that generates an output signal having an injected jitter. The jitter injection apparatus includes a first oscillator that generates a first periodic signal, a second oscillator that generates a second periodic signal having a period different from that of the first periodic signal, and a switching section that switches which of the first periodic signal and the second periodic signal is output at every predetermined timing and outputs the switched periodic signal as the output signal.

12 Claims, 9 Drawing Sheets

JITTER INJECTION APPARATUS, JITTER INJECTION METHOD, TESTING APPARATUS, AND COMMUNICATION CHIP

BACKGROUND

1. Field of the Invention

The present invention relates to a jitter injection apparatus, a jitter injection method, a testing apparatus, and a communication chip. More particularly, the present invention relates to a jitter injection apparatus that generates an output signal having an injected jitter.

2. Related Art

As a test item for a high-speed communication device or the like, there is considered a jitter tolerance testing for testing a range of an amount of jitter in which a device under test can normally be operated for a high-frequency jitter injected into an input signal. For example, Electrical Communication Standardization Division in International Telecommunication Union (ITU-T) recommends that it is necessary to inject a jitter with frequency of several hundred MHz into communication data and test a device under test by means of the communication data.

When performing such a testing, there is considered a method for using a pattern generator that generates communication data and a voltage controlled oscillator that generates a clock operating the pattern generator and injecting a jitter into the communication data by performing frequency modulation or phase modulation on this clock.

For example, there is considered a method for adding a signal according to a jitter to be injected on a control voltage being input into the voltage controlled oscillator. Moreover, as another method, there is a method for providing a variable delay circuit in the subsequent stage of the voltage controlled oscillator and controlling a delay amount of the variable delay circuit according to the jitter to be injected.

However, according to the former method, it is difficult to inject a high-frequency jitter into communication data because a range of frequency capable of being followed by the voltage controlled oscillator is low in the degree of dozens of MHz. Moreover, according to the latter method, since it takes time to change a delay amount of the variable delay circuit, it is difficult to inject a high-frequency jitter into communication data.

SUMMARY

Therefore, it is an object of some aspects of the present invention to provide a jitter injection apparatus, a jitter injection method, a testing apparatus, and a communication chip that can solve the foregoing problems. The above and other objects can be achieved by combinations described in the independent claims. The dependent claims define further advantageous and exemplary combinations of the present invention.

That is, according to the first aspect of the present invention, there is provided a jitter injection apparatus that generates an output signal having an injected jitter. The jitter injection apparatus includes: a first oscillator that generates a first periodic signal; a second oscillator that generates a second periodic signal having a period different from that of the first periodic signal; and a switching section that switches which of the first periodic signal and the second periodic signal is output at every predetermined timing and outputs the switched periodic signal as the output signal.

According to the second aspect of the present invention, there is provided a jitter injection method for generating an output signal having an injected jitter. The jitter injection method includes: generating a first periodic signal; generating a second periodic signal having a period different from that of the first periodic signal; and switching which of the first periodic signal and the second periodic signal is output at every a predetermined timing and outputting the switched periodic signal as the output signal.

According to the third aspect of the present invention, there is provided a testing apparatus that tests a device under test. The testing apparatus includes: a timing generating section that generates a timing signal having an injected jitter; a signal generating section that generates a test signal synchronized with the timing signal and inputs the test signal into the device under test; and a deciding section that decides the good or bad of the device under test based on a measured signal output from the device under test, and the timing generating section includes: a first oscillator that generates a first periodic signal; a second oscillator that generates a second periodic signal having a period different from that of the first periodic signal; and a switching section that switches which of the first periodic signal and the second periodic signal is output at every predetermined timing and outputs the switched periodic signal as the timing signal.

According to the fourth aspect of the present invention, there is provided a communication chip that transmits and receives a signal to and from an outside circuit. The communication chip includes: a transmitting section that generates a transmitting signal to be transmitted to the outside circuit; and a receiving section that receives a received signal from the outside circuit and operates according to the received signal, the transmitting section includes: a timing generating section that generates a timing signal having an injected jitter; and a signal generating section that generates a test signal synchronized with the timing signal and inputs the test signal to the receiving section, and the timing generating section includes: a first oscillator that generates a first periodic signal; a second oscillator that generates a second periodic signal having a period different from that of the first periodic signal; and a switching section that switches which of the first periodic signal and the second periodic signal is output at every predetermined timing and outputs the switched periodic signal as the timing signal.

The summary does not necessarily describe all necessary features of the present invention. The present invention may also be a sub-combination of the features described above.

DESCRIPTION OF EXEMPLARY EMBODIMENTS

The embodiments of the invention will now be described based on the preferred embodiments, which do not intend to limit the scope of the present invention, but just exemplify the invention. All of the features and the combinations thereof described in the embodiment are not necessarily essential to the invention.

Figure 1:
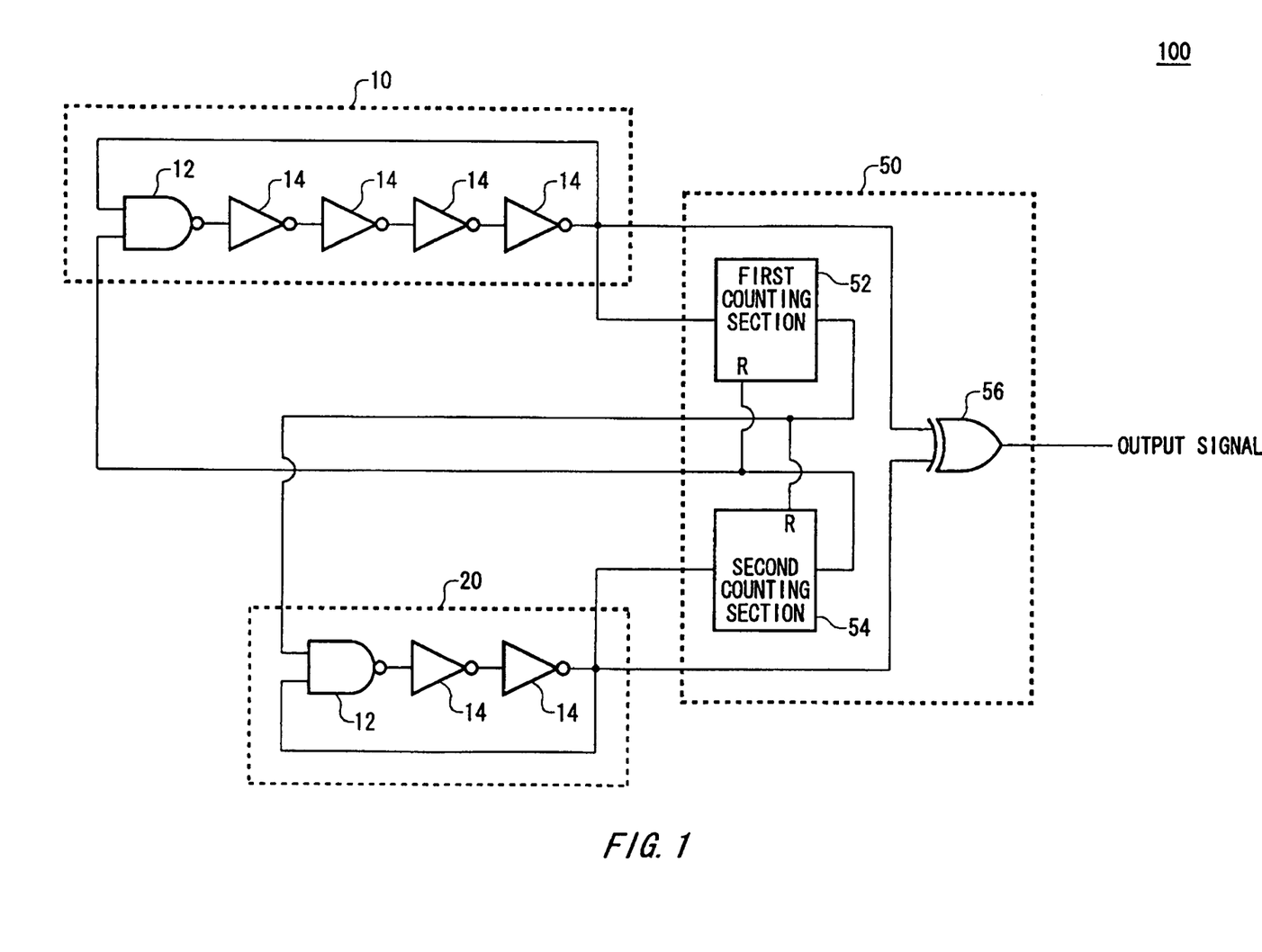
FIG. 1 is a view exemplary showing a configuration of a jitter injection apparatus according to an embodiment of the present invention.

FIG. 1 is a view exemplary showing a configuration of a jitter injection apparatus 100 according to an embodiment of the present invention. The jitter injection apparatus 100 is an apparatus that generates an output signal having an injected jitter and includes a first oscillator 10, a second oscillator 20, and a switching section 50.

The first oscillator 10 generates a first periodic signal having a predetermined period. Moreover, the second oscillator 20 generates a second periodic signal having a period different from that of the first periodic signal. For example, the first oscillator 10 may generate the first periodic signal having a period larger than an average period, which the output signal should have, by a predetermined value, and the second oscillator 20 may generate the second periodic signal having a period smaller than an average period, which the output signal should have, by the predetermined value.

The switching section 50 switches which of the first periodic signal and the second periodic signal is output at every predetermined timing, and outputs the switched signal as an output signal. That is to say, the switching section 50 alternately outputs the first periodic signal and the second periodic signal at every predetermined timing.

In the present example, the first oscillator 10 and the second oscillator 20 are a loop oscillator. The first oscillator 10 and the second oscillator 20 respectively have a plurality of cascaded inverters 14 and an AND circuit 12.

The AND circuit 12 inputs an AND signal which is a logical product of a signal output from the last-stage inverter 14 in the corresponding plurality of inverters 14 and a given control signal into the first-stage inverter 14 in the corresponding plurality of inverters 14.

In the present example, the switching section 50 counts the number of pulses of periodic signal being output. For example, the switching section 50 may count the number of pulses of periodic signal output from the switching section 50 of the first periodic signal and the second periodic signal, or may count the number of pulses of an output signal. The switching section 50 switches which of the first periodic signal and the second periodic signal is output whenever the counted value for pulses becomes a value according to the previously-described predetermined timing.

Moreover, the switching section 50 in the present example has a first counting section 52, a second counting section 54, and a synthesizing section 56. The first counting section 52 counts pulses of the first periodic signal output from the first oscillator 10, and the second counting section 54 counts pulses of the second periodic signal output from the second oscillator 20. Moreover, the first counting section 52 and the second counting section 54 are previously supplied with count reference values according to the previously-described predetermined timing. The count reference values given to the first counting section 52 and the second counting section 54 may be the same values, or may be values different from each other.

When a counted value by the first counting section 52 is identical with a count reference value, the first counting section 52 stops outputting the first periodic signal from the first oscillator 10 and starts outputting the second periodic signal from the second oscillator 20. In this example, when a counted value is identical with a count reference value, the first counting section 52 gives a control signal of High logic to the AND circuit 12 in the second oscillator 20, and gives a control signal of Low logic to the AND circuit 12 in the first oscillator 10 via the second counting section 54.

When a counted value by the second counting section 54 is identical with a count reference value, the second counting section 54 stops outputting the second periodic signal from the second oscillator 20 and starts outputting the first periodic signal from the first oscillator 10. In this example, when a counted value is identical with a count reference value, the second counting section 54 gives a control signal of High logic to the AND circuit 12 in the first oscillator 10 and gives a control signal of Low logic to the AND circuit 12 in the second oscillator 20 via the first counting section 52.

By such an operation, the first periodic signal and the second periodic signal are alternately output. In addition, in the present example, the first counting section 52 and the second counting section 54 are a counter that outputs Low logic when the counted value does not reach the count reference value and outputs High logic when the counted value reaches the count reference value. Moreover, an output port of the first counting section 52 is connected to a reset terminal of the second counting section 54 and the AND circuit 12 of the second oscillator 20, and an output port of the second counting section 54 is connected to a reset terminal of the first counting section 52 and the AND circuit 12 of the first oscillator 10.

When a counted value by the first counting section 52 reaches a count reference value, High logic is input into the AND circuit 12 of the second oscillator 20 to start oscillation. Moreover, High logic is input into the reset terminal of the second counting section 54, and thus the second counting section 54 outputs Low logic. For this reason, Low logic is input into the AND circuit 12 of the first oscillator 10, and thus the oscillation of the first oscillator 10 stops.

When a counted value by the second counting section 54 reaches a count reference value, High logic is input into the AND circuit 12 of the first oscillator 10 to start oscillation. Moreover, High logic is input into the reset terminal of the first counting section 52, and thus the first counting section 52 outputs Low logic. For this reason, Low logic is input into the AND circuit 12 of the second oscillator 20, and thus the oscillation of the second oscillator 20 stops.

The synthesizing section 56 synthesizes the first periodic signal output from the first oscillator 10 and the second periodic signal output from the second oscillator 20 to output the synthesized signal. In the present example, the synthesizing section 56 outputs an exclusive OR of the first periodic signal and the second periodic signal.

By such a configuration, it is possible to alternately output the first periodic signal and the second periodic signal having a period different from each other at every predetermined timing.

Figure 2:
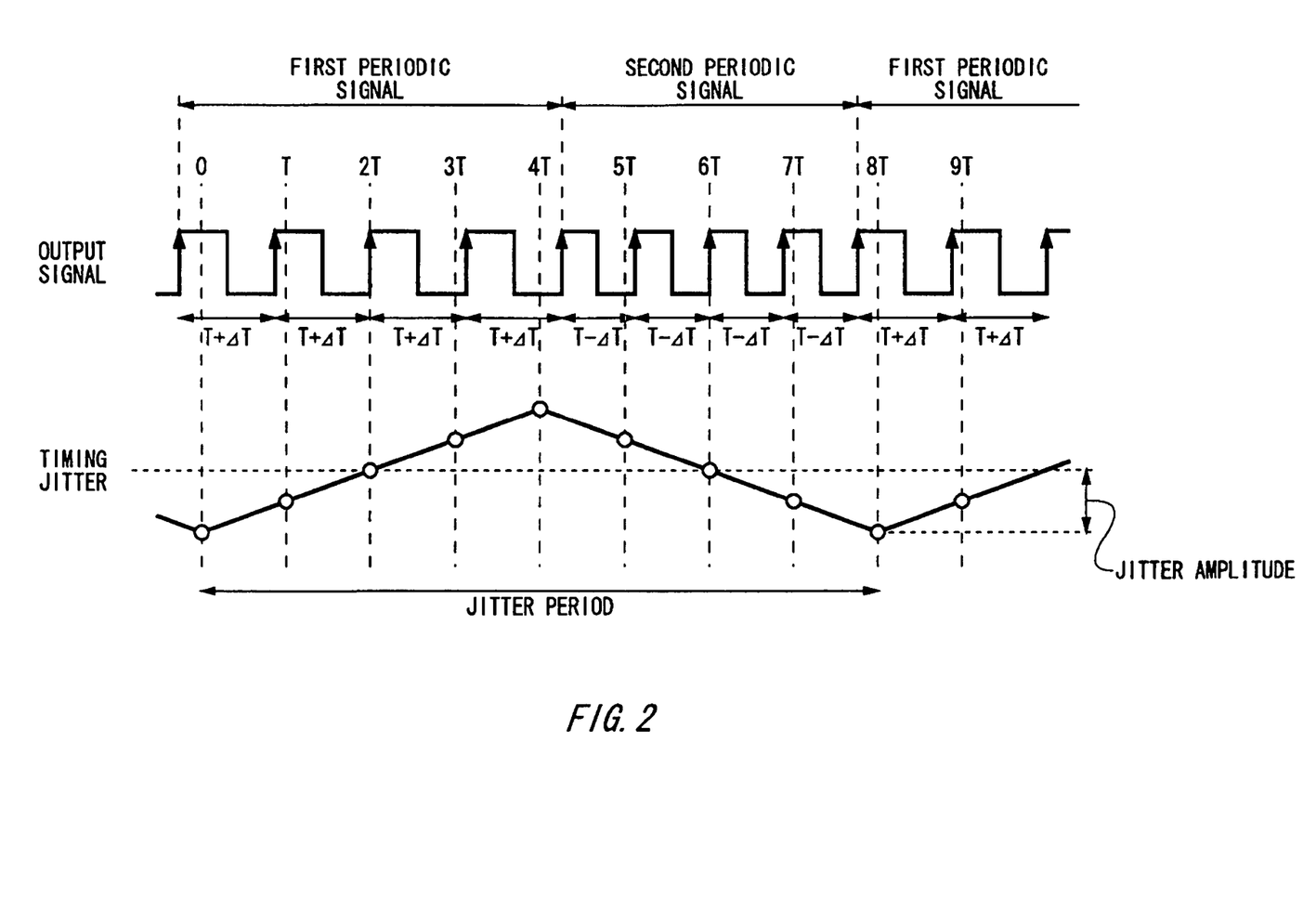
FIG. 2 is a view exemplary showing an output signal output from a jitter injection apparatus.

FIG. 2 is a view exemplary showing an output signal output from the jitter injection apparatus 100. In the present example, the first oscillator 10 generates the first periodic signal having a period larger than an average period T, which the output signal should have, by ΔT. Moreover, the second oscillator 20 generates the second periodic signal having a period smaller than the average period T by ΔT. The difference ΔT may be a sufficiently smaller value than the average period T. Moreover, in the present example, "four" is previously set as a count reference value in the first counting section 52 and the second counting section 54.

When starting the generation of output signal, High logic is first output to either of the first counting section 52 or the second counting section 54. In this example, the second counting section 54 outputs High logic.

The first oscillator 10 receives High logic from the second counting section 54, and outputs the first periodic signal. Since the first periodic signal has a period larger than the average period T of the output signal by $\Delta T$, a phase of an edge of each pulse of the output signal output from the synthesizing section 56 is late by $\Delta T$ compared with an ideal phase in each cycle.

Then, when the counted value by the first counting section 52 becomes "four", oscillation of the first oscillator 10 is stopped and the second oscillator 20 outputs the second periodic signal. Since the second periodic signal has a period smaller than the average period T of the output signal by $\Delta T$, a phase of an edge of each pulse of the output signal output from the synthesizing section 56 advances by $\Delta T$ compared with an ideal phase in each cycle.

Then, when the counted value by the second counting section 54 becomes "four", oscillation of the second oscillator 20 is stopped and the first oscillator 10 outputs the first periodic signal. The first periodic signal and the second periodic signal are alternately output by repeating such an operation.

A timing jitter of a signal is a difference between a phase of an edge of each pulse and an ideal phase. For this reason, as shown in FIG. 2, a timing jitter of an output signal increases according to $\Delta T$ while the first periodic signal is output and decreases according to $\Delta T$ while the second periodic signal is output.

For this reason, the jitter injection apparatus 100 according to the present example can generate an output signal having an injected triangular-wave jitter as shown in FIG. 2. Moreover, the jitter injection apparatus 100 in the present example can inject a jitter with frequency according to frequency switching which of the first periodic signal and the second periodic signal is output. Since the switching frequency can be controlled by the count reference values provided to the first counting section 52 and the second counting section 54, it is possible to inject a high-frequency jitter. For example, when a count reference value is set to "one", it is possible to inject a jitter with one-half frequency of frequency for an output signal.

Figure 3:
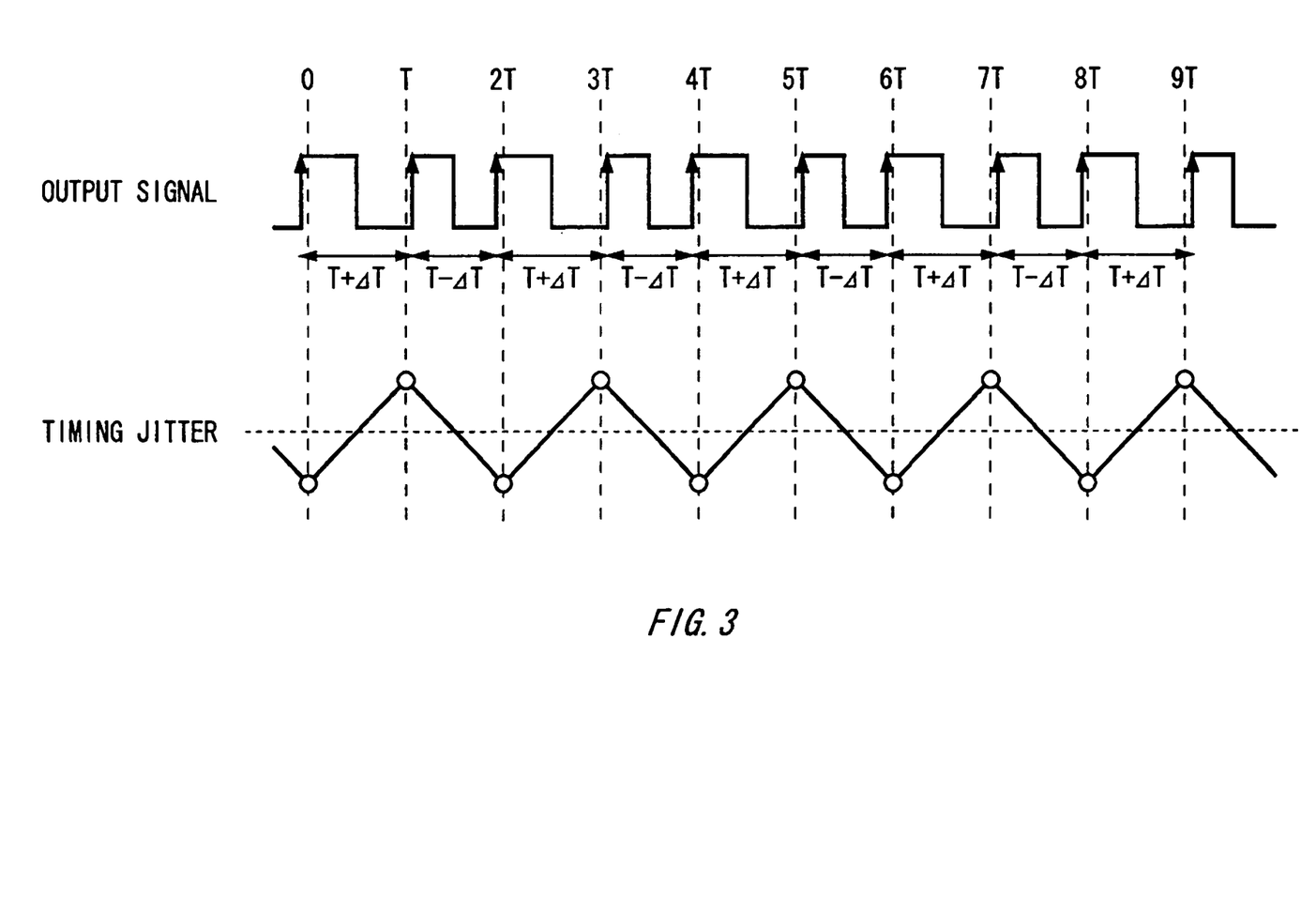
FIG. 3 is a view exemplary showing an output signal when a count reference value is set to "one".

FIG. 3 is a view exemplary showing an output signal when a count reference value is set to "one". In the present example, the first oscillator 10 generates the first periodic signal having a period larger than the average period T, which the output signal should have, by $\Delta T$. Moreover, the second oscillator 20 generates the second periodic signal having a period smaller than the average period T by $\Delta T$.

In this example, since "one" is given as a count reference value to the first counting section 52 and the second counting section 54, the first periodic signal and the second periodic signal is alternately output at every period. In this case, as shown in FIG. 3, a timing jitter injected into the output signal becomes a triangular wave having a period of 2T. By such an operation, it is possible to generate a higher-frequency timing jitter.

Figure 4:
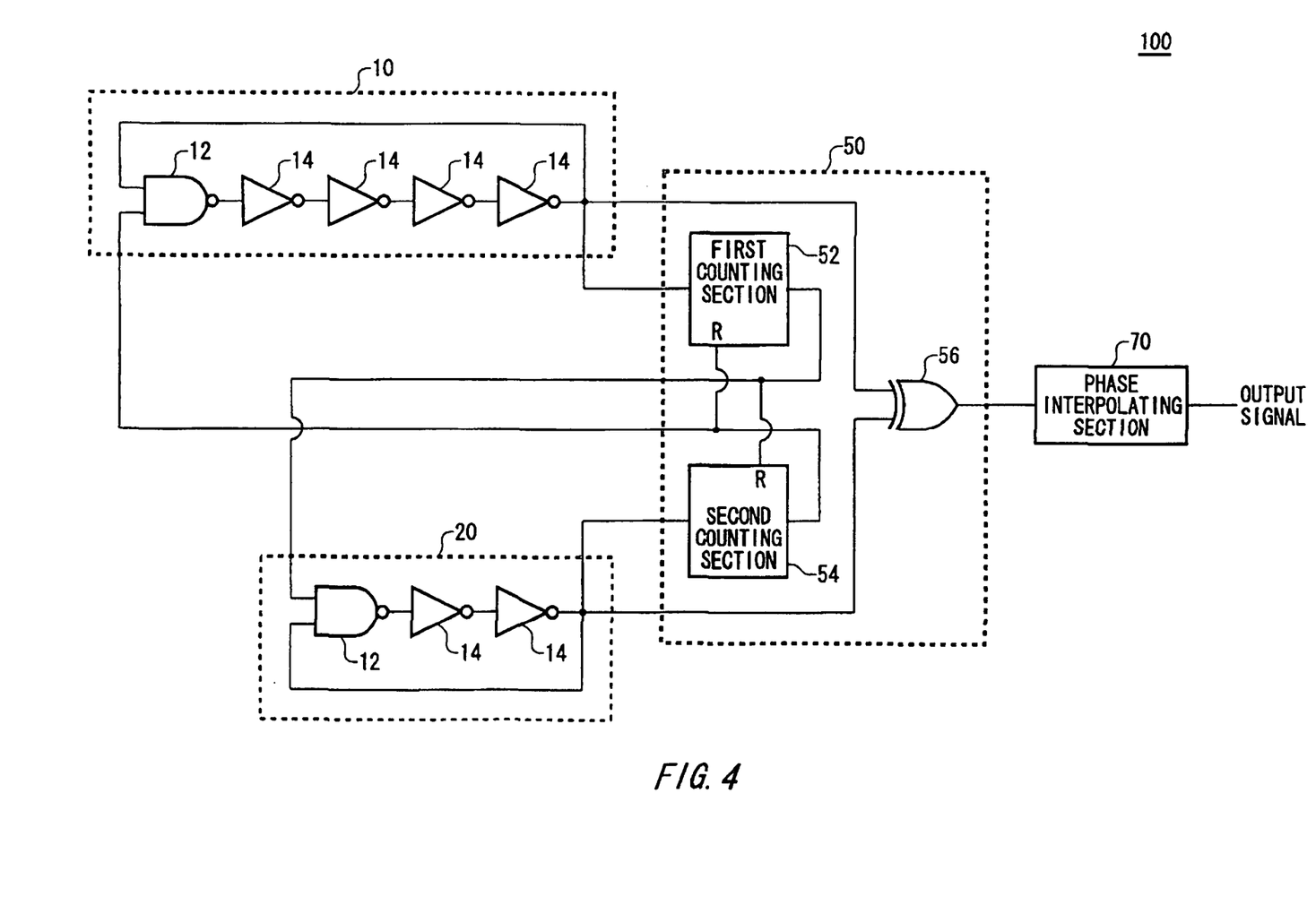
FIG. 4 is a view showing another example of a configuration of a jitter injection apparatus.

FIG. 4 is a view showing another example of a configuration of a jitter injection apparatus 100. The jitter injection apparatus 100 in the present example further includes a phase interpolating section 70 in addition to a configuration of the jitter injection apparatus 100 described with reference to FIG. 1. The other components may have the function and configuration equal to those of the components of which symbols are the same as those in FIG. 1.

The phase interpolating section 70 inserts a predetermined number of edges between edges in the same direction in the signal output from the switching section 50 at substantially regular intervals, in order to output the resultant signal as an output signal. For example, the phase interpolating section 70 may detect a timing of each rising edge of the signal output from the switching section 50, and generate a predetermined number of pulses between timings of the rising edges at regular intervals.

Figure 5:
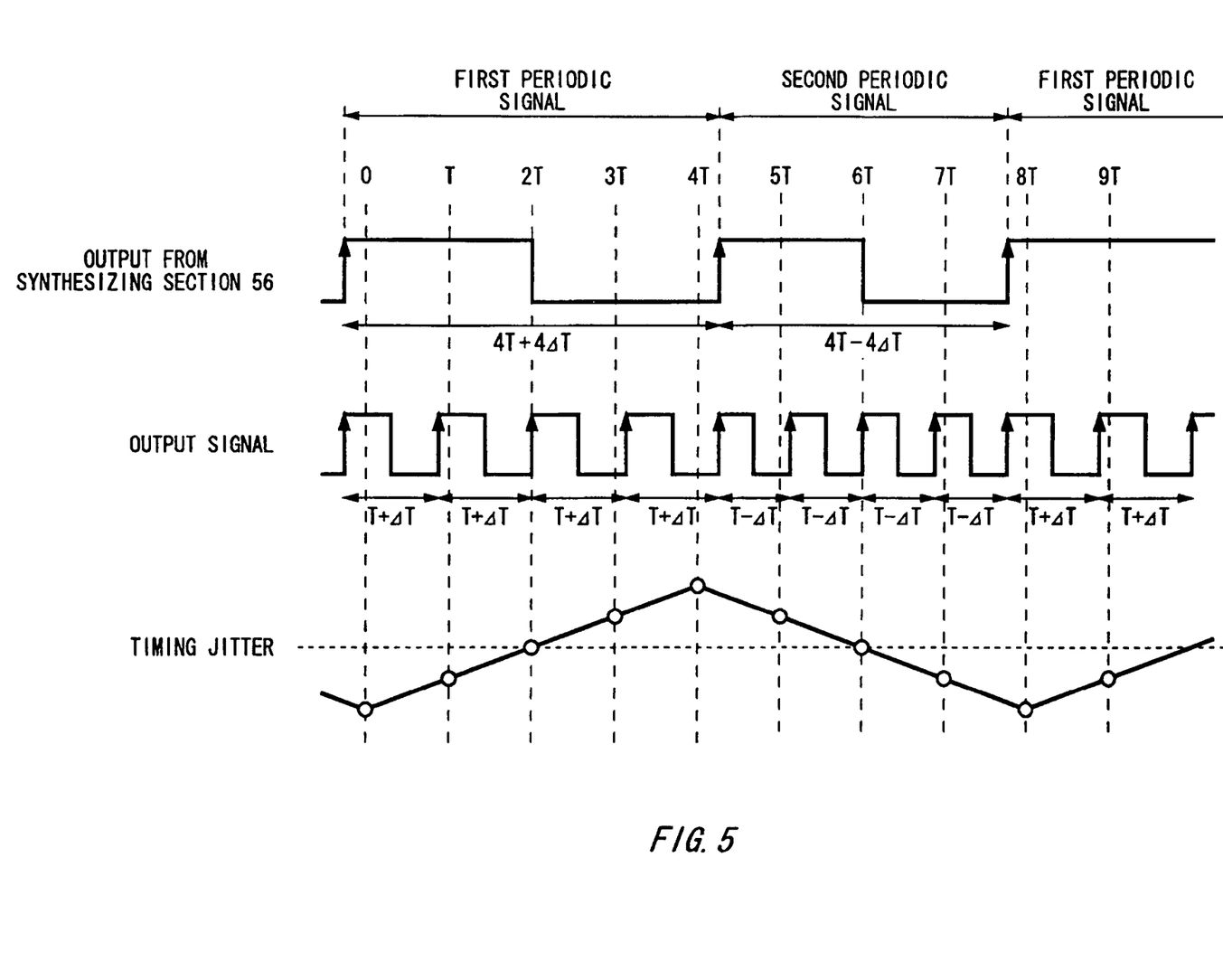
FIG. 5 is a view exemplary explaining an operation of a phase interpolating section.

FIG. 5 is a view exemplary explaining an operation of the phase interpolating section 70. In the present example, the first oscillator 10 outputs the first periodic signal of which a period is $4T+4\Delta T$. Moreover, the second oscillator 20 outputs the second periodic signal of which a period is $4T-4\Delta T$. Moreover, it is assumed that the count reference values set in both the first counting section 52 and the second counting section 54 are "one". In this case, an average period of the signal output from the synthesizing section 56 becomes 4T.

The phase interpolating section 70 detects a timing of a rising edge of the signal output from the synthesizing section 56, and generates a predetermined number of pulses between the rising edges at regular intervals. For example, the phase interpolating section 70 may generate this pulse by means of a frequency multiplier. Moreover, the phase interpolating section 70 may generate this pulse by means of a PLL circuit.

By such a configuration, it is possible to generate an output signal having frequency of an integer multiple of average frequency of the first periodic signal and the second periodic signal. Moreover, it is possible to inject a jitter of substantially half frequency of average frequency of the first periodic signal and the second periodic signal for the output signal.

Figure 6:
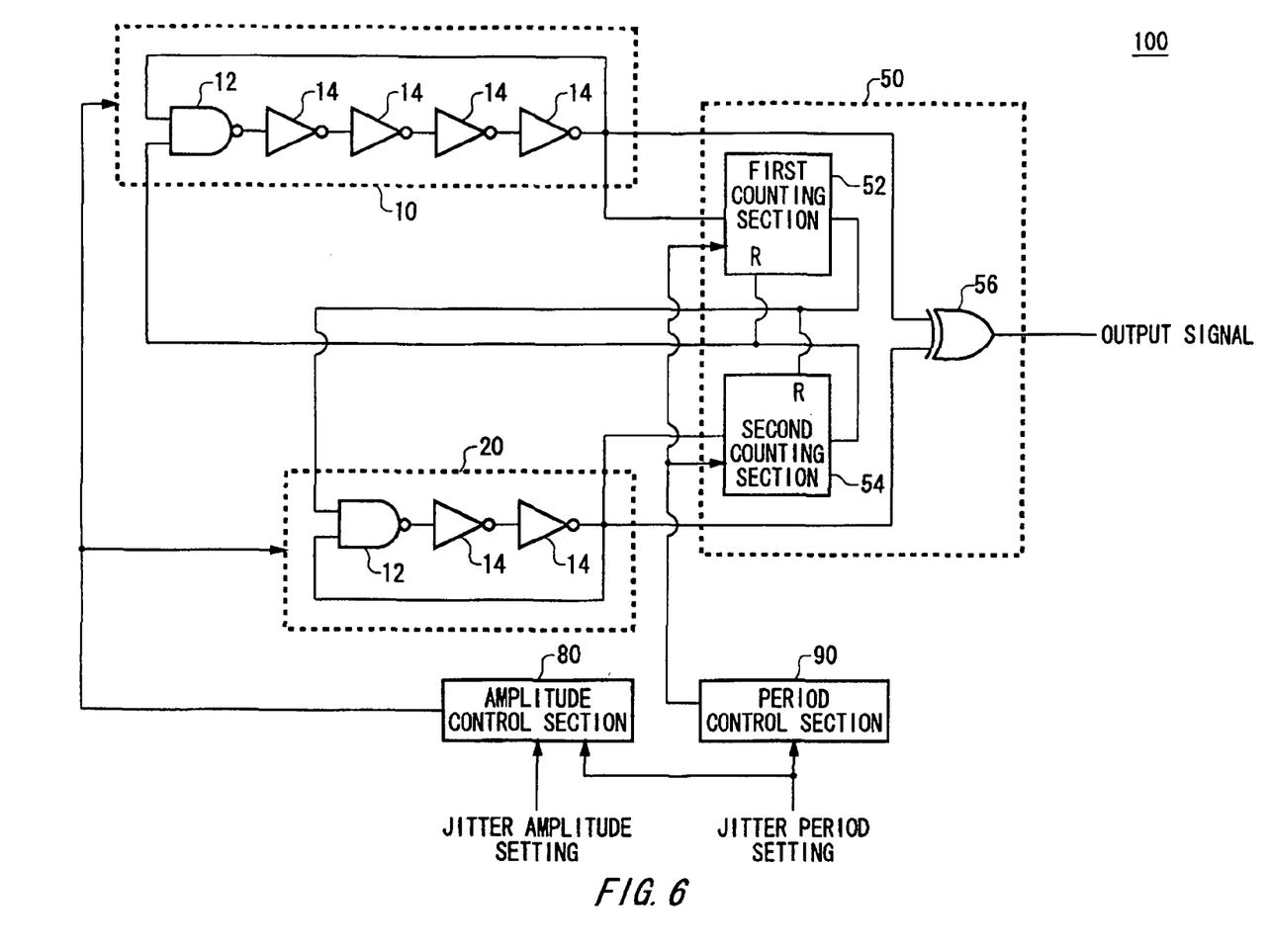
FIG. 6 is a view showing another example of a configuration of a jitter injection apparatus.

FIG. 6 is a view showing another example of a configuration of the jitter injection apparatus 100. The jitter injection apparatus 100 in the present example further includes an amplitude control section 80 and a period control section 90 in addition to a configuration of the jitter injection apparatus 100 described with reference to FIG. 1 or 4. Other components have the function and configuration similar to those of the components having the same reference numerals in FIG. 1 or 4.

The jitter injection apparatus 100 in the present example adjusts at least any one of a period of the first periodic signal, a period of the second periodic signal, a count reference value of the first counting section 52, and a count reference value of the second counting section 54, in order to control at least one of amplitude and a period of a jitter to be injected to the output signal.

As shown in FIG. 2, the period of the jitter injected to the output signal can be controlled with the count reference values set in the first counting section 52 and the second counting section 54. For example, when the same count reference value is set in the first counting section 52 and the second counting section 54, the period of the jitter injected to the output signal becomes a period obtained by multiplying two times of the count reference value by the average period of the first periodic signal and the second periodic signal.

The period control section 90 is supplied with a period setting value of the jitter to be injected into the output signal, and adjusts the count reference values set in the first counting section 52 and the second counting section 54 based on the period setting value. In this way, it is possible to control a timing switching which of the first periodic signal and the second periodic signal is output from the switching section 50 and to control the period of the jitter injected to the output signal.

The period control section 90 may be supplied with the average period of the first periodic signal and the second periodic signal, and compute the count reference value by dividing the jitter period setting value by two times of this average period. Moreover, the period control section 90 may previously have a table showing count reference values to be set for each jitter period setting value. Moreover, the period control section 90 may set the same count reference value in the first counting section 52 and the second counting section 54, or may set the count reference values different from one another.

Moreover, jitter amplitude shown in FIG. 2 can be controlled by differences of both the periods of the first periodic signal and the second periodic signal from the average period of the output signal. For example, when it is assumed that the period of the first periodic signal is T+2ΔT and the period of the second periodic signal is T−2ΔT, it is possible to inject a jitter with two-times amplitude in comparison with an example shown in FIG. 2.

The amplitude control section 80 may be supplied with an amplitude setting value of the jitter to be injected into the output signal, and control the periods of the first periodic signal and the second periodic signal based on the amplitude setting value. For example, each of the first oscillator 10 and the second oscillator 20 may have a selecting section that selects either of signals output from each inverter 14 to output the selected signal as a periodic signal, and the amplitude control section 80 may control the selecting section according to the amplitude setting value. Moreover, the amplitude control section 80 may control a power supply voltage supplied to the first oscillator 10 and the second oscillator 20 based on the amplitude setting value. Moreover, the amplitude control section 80 may control a control voltage supplied to the first oscillator 10 and the second oscillator 20 based on the amplitude setting value by constituting the first oscillator 10 and the second oscillator 20 as a voltage-controlled oscillator. The amplitude control section 80 may previously have a table made by associating the signals to be selected by the selecting section with the amplitude setting values. Moreover, the amplitude control section 80 may previously have a table made by associating the power supply voltages to be supplied to the first oscillator 10 and the second oscillator 20 with the amplitude setting values. Moreover, the amplitude control section 80 may previously have a table made by associating the control voltages to be supplied to the first oscillator 10 and the second oscillator 20 with the amplitude setting values.

Moreover, the amplitude of jitter can be controlled by adjusting count set values in the first counting section 52 and the second counting section 54. For example, when doubling the count reference values in the first counting section 52 and the second counting section 54, the amplitude of jitter also becomes two times. The amplitude control section 80 may control the count reference values in the first counting section 52 and the second counting section 54 based on the amplitude of jitter to be injected into the output signal.

Moreover, when the period control section 90 controls the count reference values in the first counting section 52 and the second counting section 54 based on the jitter period setting value, the amplitude of jitter is also changed. The amplitude control section 80 may control the periods of the first periodic signal and the second periodic signal so as to offset the change of the jitter amplitude caused by controlling the count reference value by the period control section 90. In this case, the amplitude control section 80 controls the periods of the first periodic signal and the second periodic signal based on the jitter amplitude setting value and the jitter period setting value.

Moreover, the period control section 90 may function as a count control section for changing a count reference value of this counting section whenever the counted value by the first counting section 52 or the second counting section 54 becomes the count reference value. For example, the period control section 90 may change the count reference values in the first counting section 52 and the second counting section 54 in random order. In this case, the jitter injection apparatus 100 can generate a jitter of which a period and amplitude are changed in random order. Moreover, the amplitude control section 80 may change the period of the first periodic signal or the second periodic signal corresponding to this counting section in random order whenever a counted value by the first counting section 52 or the second counting section 54 becomes the count reference value.

Figure 7:
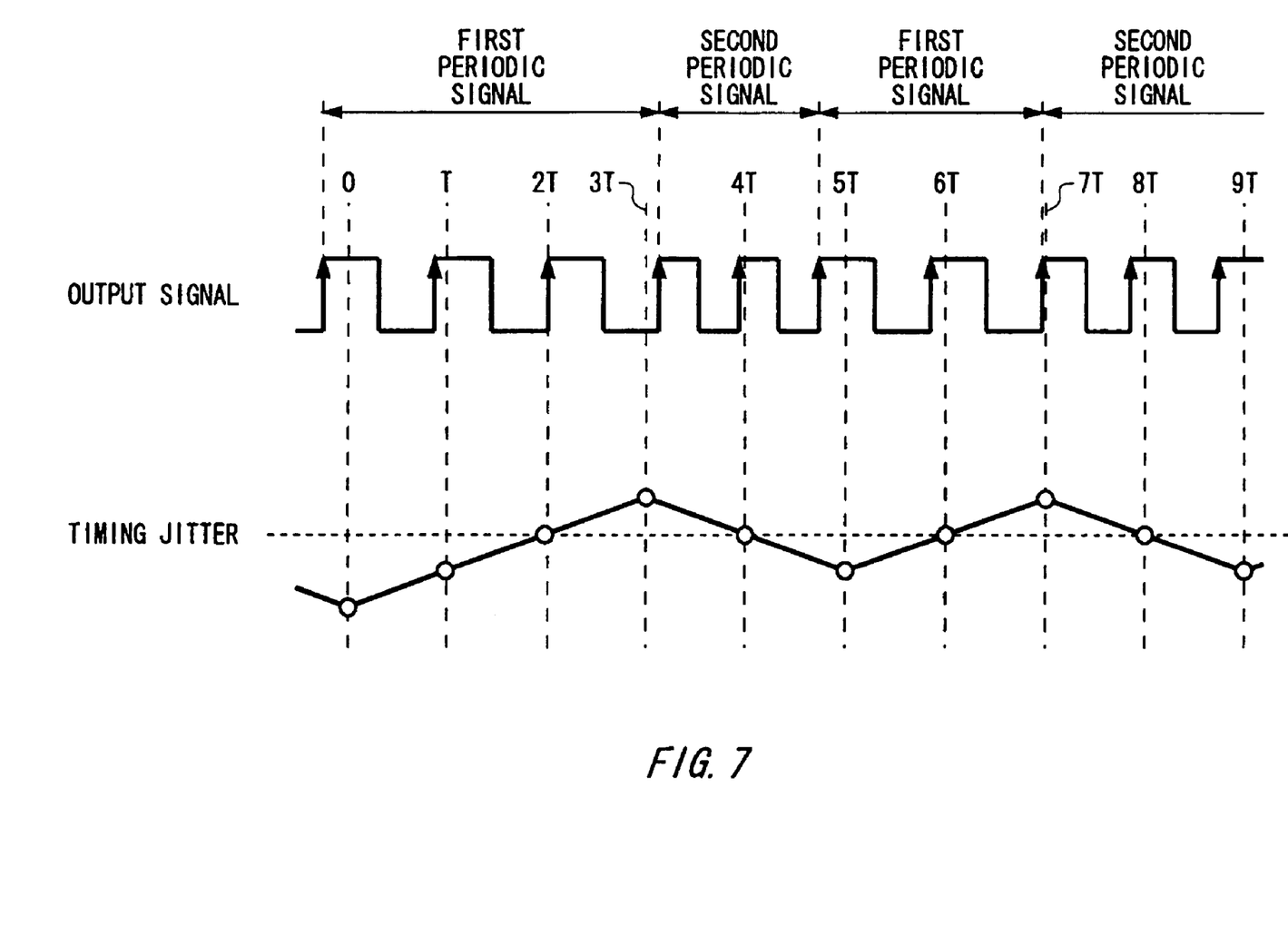
FIG. 7 is a view exemplary showing an output signal when count reference values in a first counting section and a second counting section are changed in random order.

FIG. 7 is a view exemplary showing an output signal when the count reference values in the first counting section 52 and the second counting section 54 are changed in random order. As shown in FIG. 7, the jitter injection apparatus 100 can generate a jitter of which a period and amplitude are changed in random order. That is to say, it is possible to generate a jitter except a jitter with a shape of the triangular wave.

Figure 8:
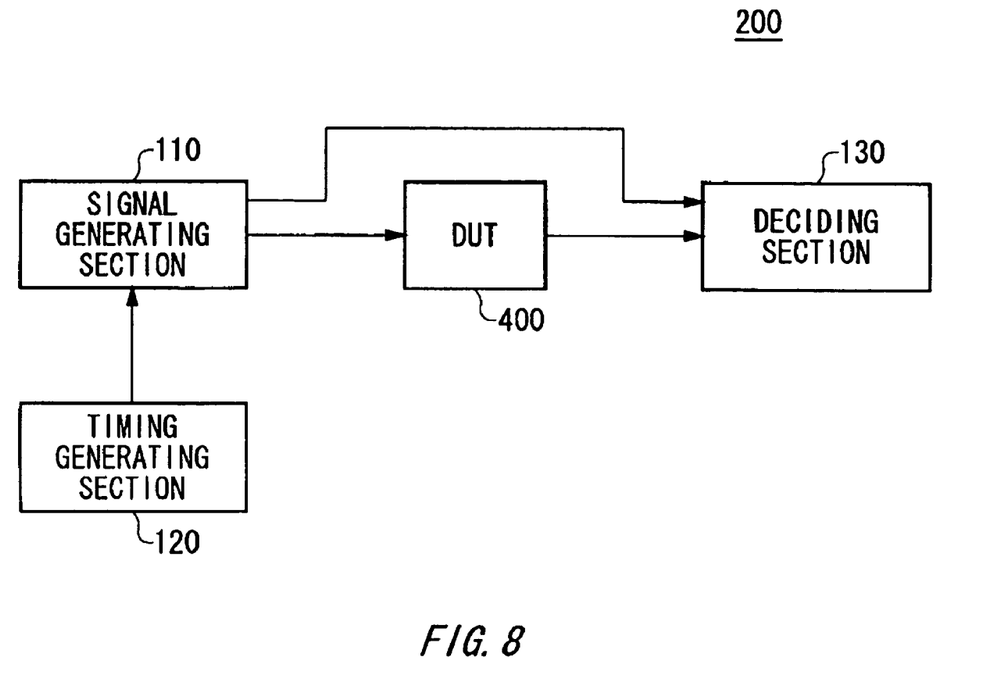
FIG. 8 is a view exemplary showing a configuration of a testing apparatus according to an embodiment of the present invention.

FIG. 8 is a view exemplary showing a configuration of a testing apparatus 200 according to an embodiment of the present invention. The testing apparatus 200 is an apparatus that tests a device under test 400 such as a semiconductor circuit, and includes a signal generating section 110, a timing generating section 120, and a deciding section 130.

The timing generating section 120 generates a timing signal having an injected jitter. The timing generating section 120 may be a jitter injection apparatus 100 described in FIGS. 1 to 7.

The signal generating section 110 generates a test signal synchronized with the timing signal provided from the timing generating section 120, and inputs the generated signal to the device under test 400. For example, the signal generating section 110 may generate a test signal in which a boundary of the data transition becomes a timing of each rising edge of the timing signal. The signal generating section 110 may have a flip-flop or the like that acquires a data value of the test signal to output the value, for example, according to a rising edge of the timing signal. In this way, it is possible to inject a jitter into a test signal to input the test signal to the device under test 400.

The deciding section 130 decides the good or bad of the device under test 400 based on a measured signal output from the device under test 400. For example, the deciding section 130 may decide the good or bad of the device under test 400 by comparing a logic pattern of the measured signal and a logic pattern of an expectation signal provided from the signal generating section 110.

Moreover, the timing generating section 120 may sequentially change amplitude of the jitter to be applied to the timing signal. In this case, the deciding section 130 decides whether the measured signal and the expectation signal are identical with each other every amplitude of each jitter. In this way, it is possible to test a tolerance for an applied jitter of the device under test 400. Moreover, the testing apparatus 200 in the present example can easily perform a testing with a high-frequency jitter on the device under test 400 because a high-frequency jitter can be easily injected into a test signal.

Figure 9:
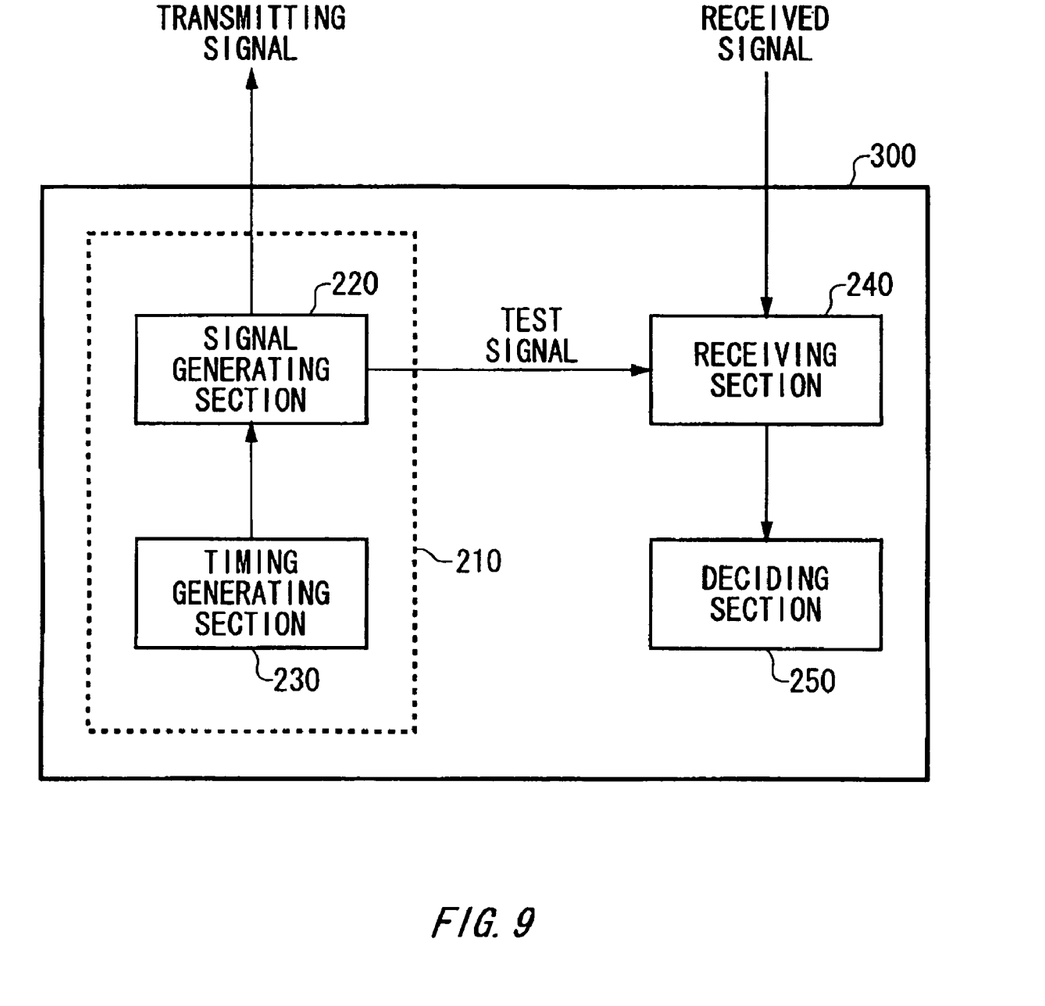
FIG. 9 is a view exemplary showing a configuration of a communication chip according to an embodiment of the present invention.

FIG. 9 is a view exemplary showing a configuration of a communication chip 300 according to an embodiment of the present invention. The communication chip 300 is an apparatus that transmits and receives a signal to and from an outside circuit, and includes a transmitting section 210, a receiving section 240, and a deciding section 250.

The transmitting section 210 generates a transmitting signal to be transmitted to an outside circuit. In the present example, the transmitting section 210 has a signal generating section 220 and a timing generating section 230. The timing generating section 230 outputs a timing signal with a predetermined period. Moreover, the signal generating section 220 generates a transmitting signal synchronized with this timing signal.

The receiving section 240 receives a received signal from the outside circuit, and operates according to this received signal. For example, the receiving section 240 may have a circuit for demodulating this received signal. By such a configuration, the communication chip 300 transmits and receives a signal to and from the outside circuit.

Moreover, the timing generating section 230 in the present example may have the jitter injection apparatus 100 described in FIGS. 1 to 7. In other words, the timing generating section 230 may generate a timing signal having an injected jitter. In this case, the signal generating section 220 generates a test signal synchronized with this timing signal, and inputs the generated signal to the receiving section 240.

The receiving section 240 operates according to a given test signal. The deciding section 250 decides whether the receiving section 240 normally operates based on a measured signal output from the receiving section 240. The deciding section 250 may compare a predetermined expectation signal and the measured signal to decide the good or bad of an operation of the receiving section 240, or may compare an expectation signal provided from the signal generating section 220 and the measured signal.

By such a configuration, the communication chip 300 can perform a self test. Moreover, the timing generating section 230 may sequentially change amplitude of the jitter to be applied to the timing signal. In this case, the deciding section 250 decides whether the measured signal and the expectation signal are identical with each other every amplitude of each jitter. In this way, it is possible to test a tolerance for the applied jitter of the communication chip 300.

The communication chip 300 may perform negotiation to communicate with an outside circuit by means of the detected a jitter tolerance value. For example, the communication chip 300 may communicate with an outside circuit suitable for this jitter tolerance value.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A jitter injection apparatus that generates an output signal having an injected jitter, comprising:
   a first oscillator that generates a first periodic signal;
   a second oscillator that generates a second periodic signal having a period different from that of the first periodic signal; and
   a switching section that switches which of the first periodic signal and the second periodic signal is output at every predetermined timing and outputs a switched periodic signal as the output signal,
   wherein the first oscillator generates the first periodic signal having a period larger than an average period, which the output signal should have, by a predetermined value,
   wherein the second oscillator generates the second periodic signal having a period smaller than the average period by the predetermined value, and
   wherein the switching section counts a number of pulses of the periodic signals being output and switches which of the first periodic signal and the second periodic signal is output whenever a counted value becomes a reference value.

2. The jitter injection apparatus as claimed in claim 1, further comprising a phase interpolating section that inserts a predetermined number of edges at substantially regular intervals between edges in the same direction in the signal output from the switching section.

3. The jitter injection apparatus as claimed in claim 1, further comprising an amplitude control section that controls at least one period of a period of the first periodic signal generated from the first oscillator and a period of the second periodic signal generated from the second oscillator based on amplitude of a jitter to be injected into the output signal.

4. The jitter injection apparatus as claimed in claim 1, further comprising a period control section that controls a timing at which the switching section switches which of the first periodic signal and the second periodic signal is output, based on a period of a jitter to be injected into the output signal.

5. The jitter injection apparatus as claimed in claim 1, further comprising an amplitude control section that controls a timing at which the switching section switches which of the first periodic signal and the second periodic signal is output, based on amplitude of a jitter to be injected into the output signal.

6. The jitter injection apparatus as claimed in claim 1, further comprising:
   a period control section that controls a timing at which the switching section switches which of the first periodic signal and the second periodic signal is output, based on a period of a jitter to be injected into the output signal; and
   an amplitude control section that controls at least one period of a period of the first periodic signal generated from the first oscillator and a period of the second periodic signal generated from the second oscillator based on amplitude of a jitter to be injected into the output signal and a period of the jitter set by the period control section.

7. The jitter injection apparatus as claimed in claim 1, wherein the switching section comprises:
   a first counting section that counts the number of pulses of the first periodic signal output from the first oscillator, and stops outputting the first periodic signal from the first oscillator and starts outputting the second periodic signal from the second oscillator when the counted value becomes the reference value;
   a second counting section that counts the number of pulses of the second periodic signal output from the second oscillator, and stops outputting the second periodic signal from the second oscillator and starts outputting the first periodic signal from the first oscillator when the counted value becomes the reference value; and
   a synthesizing section that synthesizes the first periodic signal output from the first oscillator and the second periodic signal output from the second oscillator to output the synthesized signal.

8. The jitter injection apparatus as claimed in claim 7, wherein each of the first oscillator and the second oscillator comprises:
   a plurality of cascaded inverters; and an AND circuit that inputs an AND signal of a signal output from a last-stage inverter and a given control signal into a first-stage inverter, the first counting section gives the control signal of Low logic to the AND circuit in the first oscillator and gives the control signal of High logic to the AND circuit in the second oscillator when the counted value becomes the reference value, and the second counting section gives the control signal of Low logic to the AND circuit in the second oscillator and gives the control signal of High logic to the AND circuit in the first oscillator when the counted value becomes the reference value.

9. The jitter injection apparatus as claimed in claim 7, further comprising a count control section that changes, whenever the counted value by the first counting section or the second counting section becomes the reference value, the reference value of the first counting section or the second counting section.

10. A jitter injection method for generating an output signal having an injected jitter, comprising:

generating a first periodic signal having a period larger than an average period, which the output signal should have, by a predetermined value;

generating a second periodic signal having a period different from that of the first periodic signal, the second periodic signal having a period smaller than the average period by the predetermined value; and switching which of the first periodic signal and the second periodic signal is output at every predetermined timing and outputting a switched periodic signal as the output signal, wherein the switching includes counting a number of pulses of the periodic signals being output and switches which of the first periodic signal and the second periodic signal is output whenever a counted value becomes a reference value.

11. A testing apparatus that tests a device under test, the testing apparatus comprising:

a timing generating section that generates a timing signal having an injected jitter;

a signal generating section that generates a test signal synchronized with the timing signal and inputs the test signal into the device under test; and a deciding section that decides a good or bad of the device under test based on a measured signal output from the device under test, wherein the timing generating section comprises:
a first oscillator that generates a first periodic signal,
a second oscillator that generates a second periodic signal having a period different from that of the first periodic signal, and a switching section that switches which of the first periodic signal and the second periodic signal is output at every predetermined timing and outputs a switched periodic signal as the timing signal, wherein the first oscillator generates the first periodic signal having a period larger than an average period, which the output signal should have, by a predetermined value, wherein the second oscillator generates the second periodic signal having a period smaller than the average period by the predetermined value, and wherein the switching section counts a number of pulses of the periodic signals being output and switches which of the first periodic signal and the second periodic signal is output whenever the counted value becomes a reference value.

12. A communication chip that transmits and receives a signal to and from an outside circuit, the communication chip comprising:

a transmitting section that generates a transmitting signal to be transmitted to the outside circuit; and a receiving section that receives a received signal from the outside circuit and operates according to the received signal, wherein the transmitting section comprises:
a timing generating section that generates a timing signal having an injected jitter, and
a signal generating section that generates a test signal synchronized with the timing signal and inputs the test signal to the receiving section, wherein the timing generating section comprises:
a first oscillator that generates a first periodic signal,
a second oscillator that generates a second periodic signal having a period different from that of the first periodic signal, and
a switching section that switches which of the first periodic signal and the second periodic signal is output at every predetermined timing and outputs a switched periodic signal as the timing signal, wherein the first oscillator generates the first periodic signal having a period larger than an average period, which an output signal should have, by a predetermined value, wherein the second oscillator generates the second periodic signal having a period smaller than the average period by the predetermined value, and wherein the switching section counts a number of pulses of the periodic signals being output and switches which of the first periodic signal and the second periodic signal is output whenever a counted value becomes a reference value.

* * * * *